July 20, 1943. M. GRAVES 2,324,922
AUTOMATIC TAPPING MACHINE
Filed July 28, 1942 2 Sheets-Sheet 1

FIG_1

INVENTOR.
MARK GRAVES
BY *Oberlin, Limbach & Day*
ATTORNEYS

July 20, 1943.    M. GRAVES    2,324,922
AUTOMATIC TAPPING MACHINE
Filed July 28, 1942    2 Sheets-Sheet 2
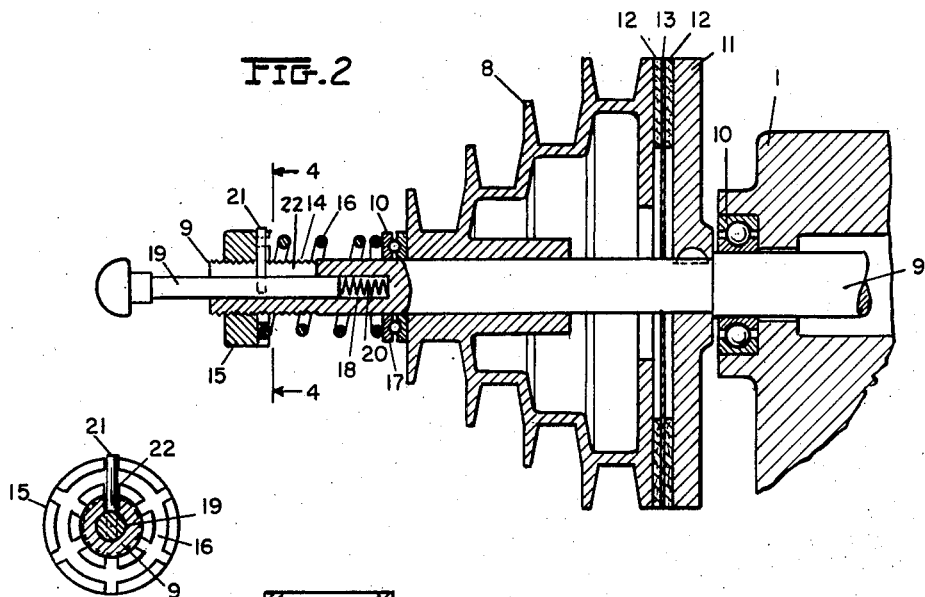
FIG. 2
FIG. 4
FIG. 5
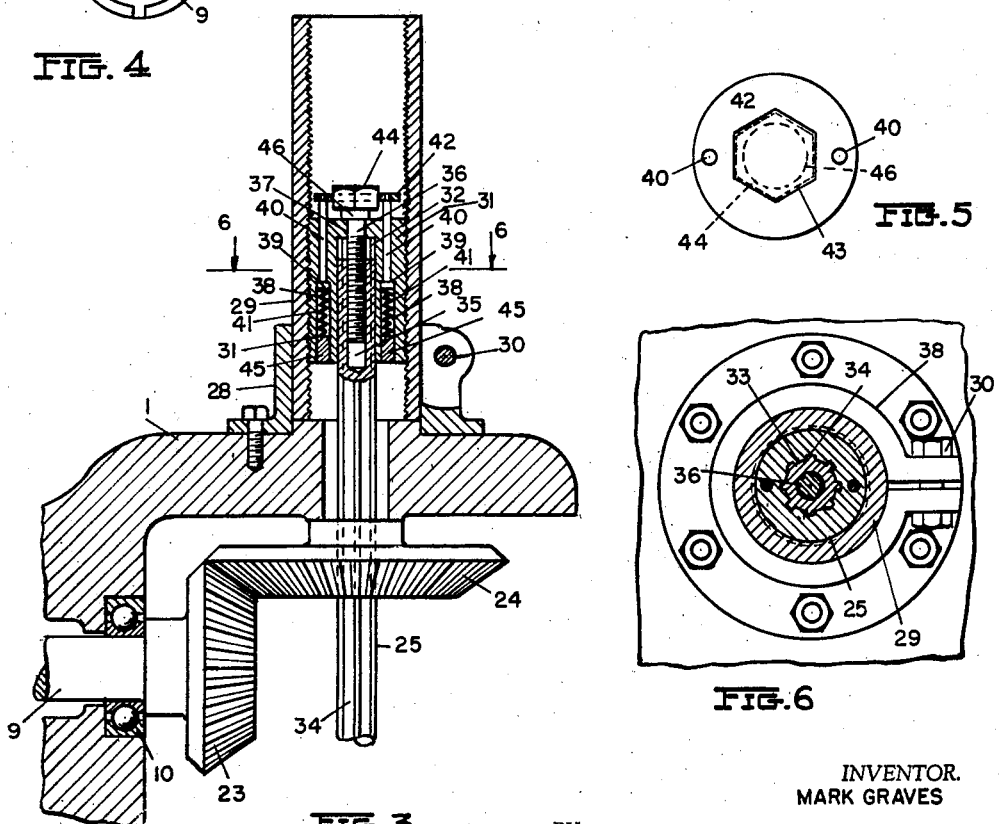
FIG. 3
FIG. 6
INVENTOR.
MARK GRAVES
BY Oberlin, Limbach & Day.
ATTORNEYS Patented July 20, 1943

2,324,922

UNITED STATES PATENT OFFICE 2,324,922

AUTOMATIC TAPPING MACHINE

Mark Graves, Cleveland Heights, Ohio

Application July 28, 1942, Serial No. 452,578

1 Claim. (Cl. 10—135)

This invention relates to the type of tapping machine in which a tapping tool, carried by a rotary driven spindle, enters a hole to be tapped, or threaded, cuts a thread therein to a desired depth, and then by reversal of the spindle is withdrawn, and particularly to the type of such machine wherein the operation is automatic.

An object of the present invention is to provide novel simple mechanism which will automatically, in continuous operation, feed a tap-carrying spindle downward, and retract same, as a succession of work pieces, fed thereto manually, are tapped.

Another object is the provision of novel means to prevent breakage of the tap, or other part of the machine, when an obstruction is encountered in threading a work-piece. The movement of the tap being automatic it is essential that provision be made whereby movement of the tap is automatically stopped when a stress is imposed which otherwise would cause breakage.

A further object is to support the rotating spindle independently of a work-piece, whereby the spindle controls the advance of a tap, as its cuts a thread, thereby insuring the formation of perfect threads.

To the accomplishment of the foregoing and related ends, said invention, then, consists of the means hereinafter fully described and particularly pointed out in the claims. To secure reversing drive in the spindle, the said invention contemplates use of a reversing motor as a power source, and secures reversing control thereof by the use of limit switches which respectively are operated by the spindle as the tap completes its thread cutting and as it reaches the desired maximum elevation on retraction. A slip clutch installed between said motor and the driving gear engaging said spindle is adjustable and provides means to determine readily the stress which will stop the spindle and tap from further rotation until the cause of such stress has been removed. The combination of the invention is completed by mounting a lead screw in fixed relation on the upper end of the spindle and in engaging relation with the internal threads of a sleeve mounted in fixed relation on the housing of the machine.

The annexed drawings and the following description set forth in detail certain structure embodying the invention, such disclosed means constitute, however, merely a preferred embodiment of said invention; and, being but one of the various mechanical forms in which the principle of the invention may be used, is not in limitation thereof.

In said drawings:

Fig. 2 is a cross-sectional view of the clutch assembly;

Fig. 3 is a cross-sectional view of the lead screw assembly showing the spindle drive;

Fig. 4 is a cross-sectional view on line 4—4 in Fig. 2 showing the locking device on the resilient means of the clutch;

Fig. 5 is a top view showing the relation of the locking device to the stud bolt mounting the lead screw element on the spindle; and Fig. 6 is a cross-sectional view on the line 6—6 in Fig. 3 showing the relation of the parts of the lead screw assembly.

Figure 1:
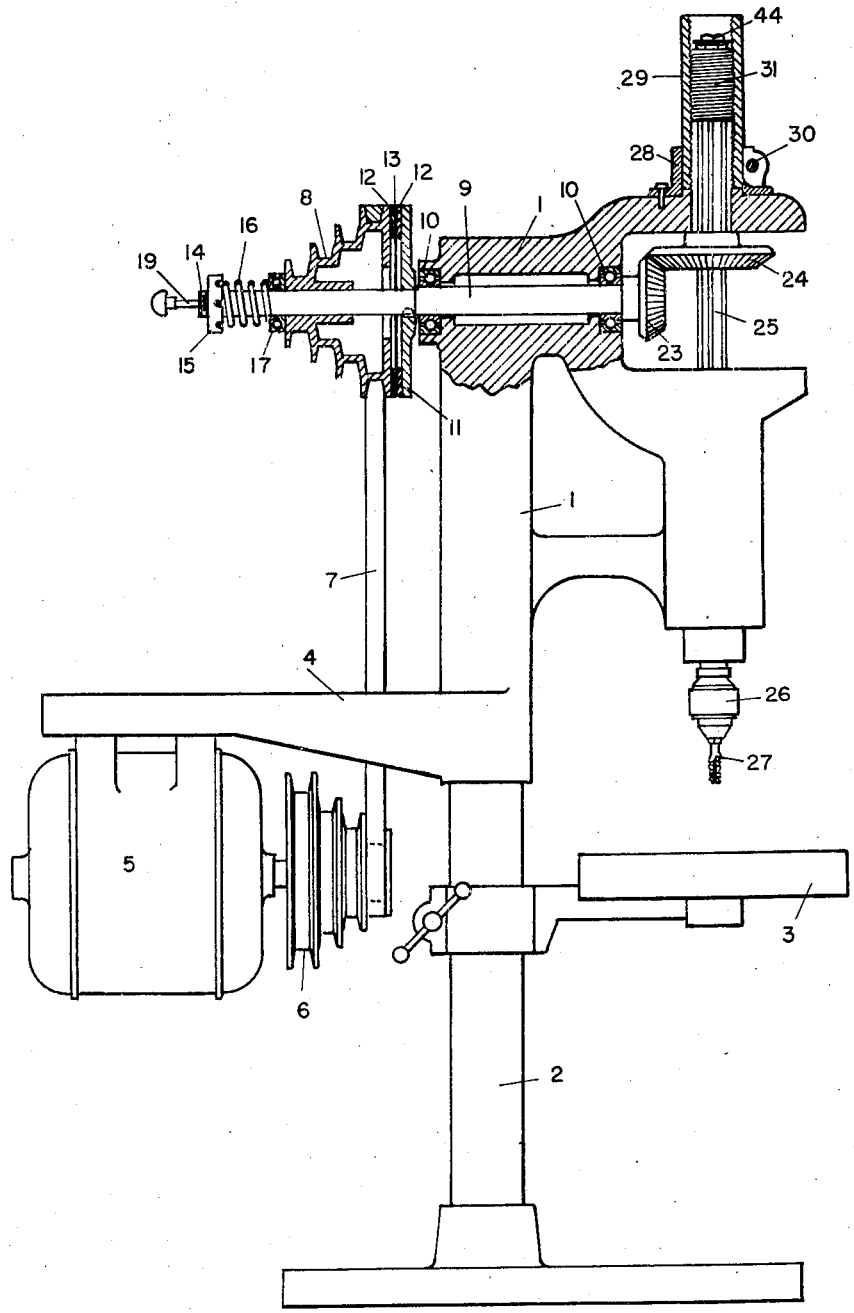
Fig. 1 is an elevational view partly in cross-section.

Referring to the drawings, a housing 1 is supported on a column 2 upon which a work table 3 is adjustably mounted in fixed relation. A bracket 4 borne by the housing 1 supports a reversible motor 5, provided with a cone pulley 6. A belt 7 from the pulley 6 drives a cone pulley 8 which is rotatably mounted on a drive shaft 9 which is transversely mounted in the top of housing 1 on bearings 10.

A drive plate 11 is non-rotatably mounted on the shaft 9 between pulley 8 and housing 1. Drive plate 11 and the adjacent face of pulley 8 are each provided with suitable clutch facings 12 and a clutch plate 13 is interposed therebetween as in a conventional clutch construction. The outside end of shaft 9 is provided with a thread 14 upon which a castellated nut 15 is mounted with its slots turned toward the pulley 8, and a coiled pressure spring 16 is mounted about shaft 9 between said nut 15 and a thrust bearing 17 mounted on shaft 9 in engagement with pulley 8. To secure nut 15 in a fixed position causing spring 16 to exert a desired pressure on the pulley 8, the shaft 9 is provided with an internal bore 18 within which a bolt 19 is inserted against the pressure of a spring 20. A lock pin 21 is secured transversely of the bolt 19 in a position between thrust bearing 17 and nut 15, being inserted through a slot 22 in the side wall of the bore 18.

On the inside end of shaft 9, and within the housing 1, a bevel gear 23 is affixed in engagement with a driving bevel gear 24, through which a splined spindle 25 is mounted in slidable non-rotatable relation. The lower end of the spindle 25 is provided with a chuck 26 and a tap 27 in the conventional manner.

A split collar 28 is mounted on top of housing 1 in concentric relation with drive gear 24 and spindle 25. An internally threaded sleeve 29 is inserted in said collar 28 and locked therein by means of the bolt and nut assembly 30. Operatively engaging the threads of sleeve 29 is an externaly threaded lead screw element 31. A bore 32 partially through element 31 is provided with internal splines 33 in engagement with splines 34 on spindle 25. The upper end of spindle 25 is provided with a threaded bore 35 for the insertion of a threaded bolt 36 which is inserted through aperture 37 in the closed end of element 31 and draws the element 31 into fixed relation with spindle 25. To provide locking means for bolt 36, a pair of holes 38 are provided longitudinally of element 31 and in diametrical relation, the lower portions of which holes are enlarged providing shoulders 39 against which the heads of pins 40 are urged by springs 41. On the upper ends of pins 40 a washer 42, provided with a hexagon shaped opening 43, is mounted in a position to engage the hexagon shaped head 44 of bolt 36. The pins 40 are urged into engagement with shoulders 39 by coil springs 41 held in the enlarged portion of holes 38 by plugs 45, whereby the washer 42 is held in such position that the hexagon head 44 is fitted within the opening 43 in washer 42. The lower portion of head 44 is rounded as shown at 46, permitting rotation of head 44 in aperture 43 in washer 42 when the latter is depressed against the urge of springs 41.

In operating the described automatic tapping machine, a tap 27 operative to cut a thread of a desired gauge in an aperture of a work-piece will be mounted in the chuck 26. A sleeve 29 with an associated lead screw element 31 will be clamped in the collar 28, the internal thread of the sleeve and the external thread of the element being of the same gauge as that of the tap in use. The spindle 25 will be lifted inserting the splined end thereof within the splines of the internal bore 32 in element 31. A hexagon headed bolt 36 will be inserted through the aperture 37 in the upper end of element 31 and threaded into the bore 35 in the end of spindle 25. A socket wrench applied to the hexagon head 44 of bolt 36 will depress washer 42 into position engaging the rounded portion 46 of head 44 and permit the bolt 36 to draw the element 31 into close relation with spindle 25. On removal of the wrench washer 42 will be lifted by pins 40 under urge of the springs 41 and will engage the hexagon head in locked relation.

In adjusting the clutch, the rod 19 will be pressed inwardly against spring 20, releasing the nut 15 from its engagement with locking pin 21. By rotation of the nut 15 the desired pressure is exerted on spring 16 which will be transmitted to the clutch assembly. On release rod 19 will be moved outwardly and pin 21 will engage a slot of the castellated nut 15 locking it against rotation on shaft 9.

Control of the reversing motor 5 is secured in a conventional manner with limit switches so mounted as to be engaged by tripping elements carried by the spindle as is well understood in the art. Being no part of the present invention an embodiment thereof is not described.

The machine being adjusted and the motor started, the tap will be entered into an aperture of a work-piece positioned on the table 3. Advance of the tap will be controlled by the movement of lead screw element 31 in sleeve 29. When a desired depth has been reached the motor 5 will reverse and under control of said lead screw element the tap will be withdrawn from the work and raised a distance to permit placement of a new work-piece. The motor will then again reverse and the machine will in continuous operation automatically tap work-pieces placed successively in position on the table 3. If and when, anything prevents the tap from cutting a thread, the clutch will slip and the machine may be stopped before the tap is broken or the threads on the lead screw have been injured.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:

In an automatic tapping machine, having a lead screw assembly comprising an internally threaded sleeve, detachably affixed on the housing of such machine; an externally threaded cylindrical guide element operatively mounted within said sleeve, said element being provided with a splined internal bore; the improvement comprising means detachably depending a splined spindle from said guide element, with splines of spindle and element in operative engagement, said means including a stud bolt inserted in said spindle through said element and a device on said element locking said bolt against rotation.

MARK GRAVES.